(12) United States Patent
LeVey

(10) Patent No.: US 10,505,350 B2
(45) Date of Patent: Dec. 10, 2019

(54) PLUG FOR UTILITY ENCLOSURE OR PENETRATION

(71) Applicant: Cerro Wire LLC, Hartselle, AL (US)

(72) Inventor: Kenneth LeVey, Chicago, IL (US)

(73) Assignee: Cerro Wire LLC, Hartselle, AL (US)

( * ) Notice: Subject to any disclaimer, the term of this patent is extended or adjusted under 35 U.S.C. 154(b) by 0 days.

(21) Appl. No.: 15/922,537

(22) Filed: Mar. 15, 2018

(65) Prior Publication Data

US 2018/0269665 A1   Sep. 20, 2018

Related U.S. Application Data

(60) Provisional application No. 62/472,343, filed on Mar. 16, 2017, provisional application No. 62/534,823, filed on Jul. 20, 2017.

(51) Int. Cl.

| *H02G 3/04* | (2006.01) |
| *H02G 3/08* | (2006.01) |
| *H02G 9/10* | (2006.01) |
| *H02G 3/12* | (2006.01) |
| *H02G 3/18* | (2006.01) |

(52) U.S. Cl.
CPC ............. *H02G 3/04* (2013.01); *H02G 3/08* (2013.01); *H02G 3/121* (2013.01); *H02G 3/185* (2013.01); *H02G 9/10* (2013.01)

(58) Field of Classification Search
CPC .......... H02G 3/04; H02G 3/08; H02G 3/121; H02G 3/185; H02G 9/10
USPC ........................................................ 174/564
See application file for complete search history.

(56) References Cited

U.S. PATENT DOCUMENTS

| 4,163,503 A * | 8/1979 | McKinnon .............. H02G 9/10 137/371 |
| 5,147,980 A | 9/1992 | Ferguson, Jr. |
| 5,562,222 A | 10/1996 | Jordan et al. |
| 6,932,099 B2 * | 8/2005 | Mahaney ................ H02G 9/10 137/15.08 |
| 9,346,593 B2 * | 5/2016 | Dang .................... B65D 50/00 |
| 2006/0060368 A1 | 3/2006 | Dinh |

(Continued)

FOREIGN PATENT DOCUMENTS

CA        2715786 A1    3/2012

OTHER PUBLICATIONS

International Search Report and Written Opinion issued by ISA/EPO in connection with PCT/US2018/022965 dated Aug. 28, 2018.

*Primary Examiner* — Andargie M Aychillhum
*Assistant Examiner* — Michael F McAllister
(74) *Attorney, Agent, or Firm* — Levenfeld Pearlstein, LLC

(57) ABSTRACT

Plugs and covers for a utility enclosure or penetration prevent the ingress of concrete. One plug includes a sidewall configured to be received in an open end of the utility enclosure or penetration, the sidewall defines a periphery. The plug also includes a lid extending over one end of the sidewall, the lid having a body extending over an inner peripheral area defined by the sidewall, and a flange extending outwardly from the body. A cover fits over a top of the enclosure and seals to the enclosure or a blank covering the enclosure. Connector plugs prevent concrete from entering connector openings and an environmental sealing material is applied to an outside of the enclosure. A clip for securing the utility enclosure to a form is also disclosed.

8 Claims, 14 Drawing Sheets

(56) References Cited

U.S. PATENT DOCUMENTS

2012/0073853 A1\* 3/2012 Hickey ................. H02G 3/185
                                                                                        174/66
2012/0111866 A1\* 5/2012 Freeman ................ B65D 88/76
                                                                                        220/484

\* cited by examiner

PLUG FOR UTILITY ENCLOSURE OR PENETRATION

CROSS-REFERENCE TO RELATED APPLICATION DATA

This application claims the benefit of and priority to Provisional U.S. Application Ser. Nos. 62/472,343, filed Mar. 16, 2017 and 62/534,823, filed Jul. 20, 2017, both entitled Plug for Utility Enclosure or Penetration, the disclosures of which are incorporated herein in their entireties.

BACKGROUND

The present disclosure relates generally to a utility enclosure, and in particular, to plugs for utility enclosures or penetrations for use during installation of the utility enclosures or penetrations in a structural form.

An electrical enclosure or penetration may be installed in a concrete form to create a conduit through the concrete form for, for example, piping, duct work or electrical cables or to be used as a junction box. The concrete form may be, for example, a floor, ceiling, wall or the like.

Enclosures take many forms. For example, an enclosure or junction box may include an open top and/or open bottom and connectors or nipples open to the junction box interior for connecting conduit and the like. In one installation of an electrical enclosure, a bottom, open end of the enclosure is closed off using tape. The bottom, taped end is then positioned against a shape form, such as a plywood form, in which the concrete poured. The electrical enclosure may be held against the form with a fastener, such as a screw or nail. Unused, e.g., open nipples or connectors are likewise closed taped off using tape, as may be an open top of the enclosure.

Concrete is poured into the shape form around the electrical enclosure. The shape form, i.e., the plywood, may then be removed from the concrete to make the concrete form with the electrical enclosure installed therein. To complete installation of the electrical enclosure, the tape covering the bottom, open end of the electrical enclosure is then removed, for example, by cutting. A similar procedure may be used for other penetrations such as piping or ductwork.

However, when installing the electrical enclosures or other penetrations above, concrete will sometimes flow between the form and the tape, which creates a skim layer of concrete over the tape closing the bottom end of the enclosure. Concrete may also enter the enclosure through the tape covering the openings in the enclosure. To complete installation, a worker must first remove the skim layer of concrete, and then remove the tape. Additionally, the tape does not form a sufficient seal over the bottom end of the enclosure, and concrete may flow through some portions of the tape, for example, at seams or gaps in the tape, and into the enclosure, where the concrete may cure.

Accordingly, there is a need for plugs for use in installation of a utility enclosure or penetration to seal against ingress of concrete to the utility enclosure or penetration. In some instances in which the opening may be later used, the plugs may be easily removed upon installation of the enclosure or penetration. In some instances in which the plugs are encased in concrete, the plugs remain in place following installation.

SUMMARY

According to one aspect, there is provided a plug for a utility enclosure or penetration. The plug includes a sidewall configured to be received in an open end of the utility enclosure or penetration, the sidewall defining a periphery, a lid extending over one end of the sidewall, the lid having a body extending over an inner peripheral area defined by the sidewall, and a flange extending outwardly from the body.

According to another aspect, there is provided a utility enclosure or penetration having an enclosure or penetration body having an open end, and a plug configured for removable positioning in the open end. The plug includes a sidewall configured to be received in the open end of the enclosure or penetration body, the sidewall defining a periphery, and a lid having a body extending over an inner peripheral area defined by the sidewall and a flange extending outwardly from the body.

According to still another aspect, a cover for a utility enclosure includes a circular top portion and a lip depending from the top portion. The top portion has a first octagonal recess formed therein that defines eight symmetrical points. The points extend to a juncture of the top portion and the lip. The cover is configured to fit onto a hexagonal enclosure with sides of the hexagonal enclosure fitting into the hexagonal recess. The cover is also configured to fit onto a circular blank for an enclosure with an edge of the circular blank secured by the depending lip.

In an embodiment, the depending lip has a plurality of spaced apart undercuts formed therein, extending inwardly of the depending lip. In an embodiment the cover includes a plurality of channels formed therein in a hub and spoke configuration. The channels can include enlarged head spaces at their respective ends to, for example, accommodate fasteners that secure the blank to the enclosure. An adhesive can be positioned at about the juncture of the top portion and the depending lip.

In another aspect a connector plug for a utility enclosure, which enclosure has a tubular connector for conduit or the like extending therefrom, and which connector has a screw threadedly engaged with a side of the tubular connector includes a circular top portion and a deep skirt depending from the top portion. The skirt has a circumferentially extending tab formed at an end thereof. The tab has an upwardly projecting finger at an and thereof. The tab and finger define an open, lateral circumferentially extending slot between the tab and skirt.

In yet another aspect, a utility enclosure includes an enclosure body having an open end and one or more tubular connectors, each connector having a screw threadedly engaged with a side of the tubular connector. A plug is configured for removable positioning in the open end. The plug has a sidewall configured to be received in the open end of the enclosure or penetration body. The sidewall defines a periphery.

A lid has a body extending over an inner peripheral area defined by the sidewall and a flange extending outwardly from the body. A connector plug is configured for positioning on each of the one or more connectors. The connector plug has a circular top portion and a deep skirt depending from the top portion. The skirt has a circumferentially extending tab formed at an end thereof. The tab has an upwardly projecting finger at an end thereof, the tab and finger defining an open, lateral circumferentially extending slot between the tab and skirt. An environmental sealing material is applied to at least a portion of the enclosure body and the connector plug and screw. In an embodiment, the connector plug and sealing material on the connector plug are removable from the connector to expose an end of the connector and to expose the screw for connecting a member thereto.

A clip for securing the utility enclosure to a form, which enclosure has a wall and an opening in the wall, includes a generally L-shaped body having a first leg and a second leg generally perpendicular to the first leg. The first leg has an opening at a location spaced from a juncture of the first and second legs. A pair of fingers depend from the first leg. The fingers are parallel to the second leg. A protrusion is formed in the second leg that extends in a direction toward the first leg. The clip, when positioned on the enclosure wall is temporarily secured to the enclosure wall by engagement of the protrusion with the opening in the enclosure wall.

In an embodiment, the protrusion is a quarter-spherical protrusion formed in the second leg. The depending fingers can have a ramped end to ease installation of the clip on the enclosure wall. An end of the second leg can have a hook-like portion extending away from the first leg to grasp the leg to disengage the protrusion from the wall to ease removing the clip from the enclosure.

These and other features and advantages of the present invention will be apparent from the following detailed description, in conjunction with the appended claims.

BRIEF DESCRIPTION OF THE DRAWINGS

FIGS. 10 and 11 are perspective illustrations of an embodiment of the connector plug in which FIG. 10 shows the connector plug and FIG. 11 shows the connector plug installed on an enclosure connector;

FIGS. 15-18 illustrate an embodiment of a clip used with an enclosure, in which, FIG. 15 illustrates the clip as attached to the enclosure as seen from the outside of the enclosure, FIG. 16 is an enlarged illustration of the clip as seen from the inside of the enclosure; FIG. 17 shows the clip removed from the enclosure for ease of illustration and FIG. 18 shows the underside of the clip as seen from the outside of the enclosure.

DETAILED DESCRIPTION

While the present device is susceptible of embodiment in various forms, there is shown in the figures and will hereinafter be described a presently preferred embodiment with the understanding that the present disclosure is to be considered an exemplification of the device and is not intended to be limited to the specific embodiment illustrated.

Figure 1:
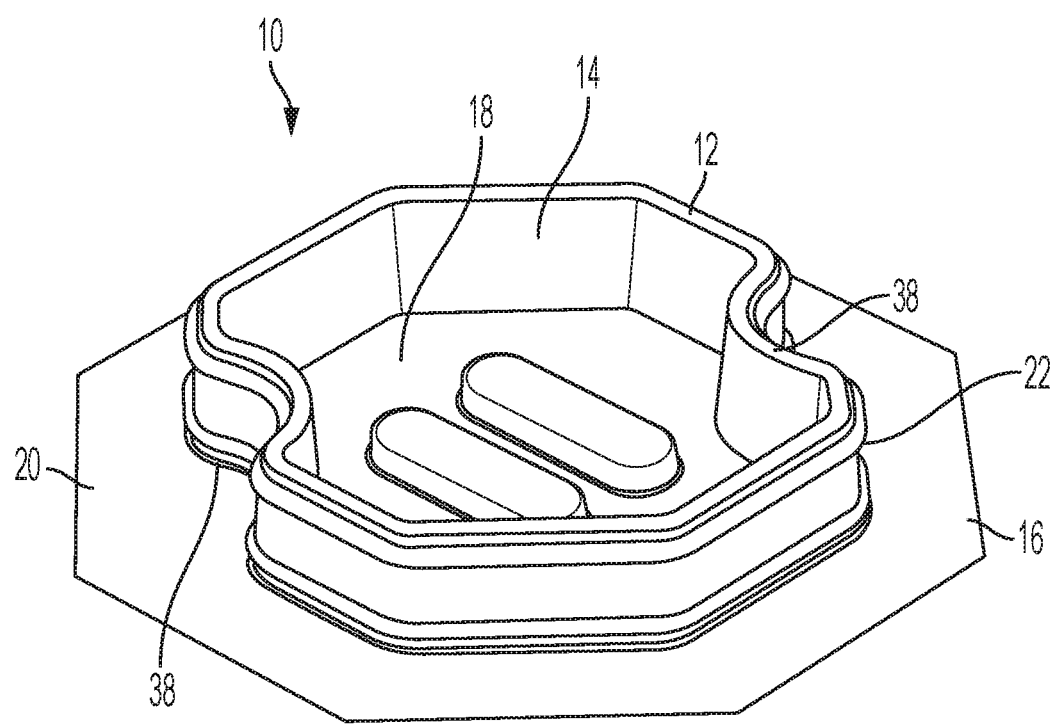
FIG. 1 is a perspective view showing an inner side of an access plug according to an embodiment described herein.
Figure 2:
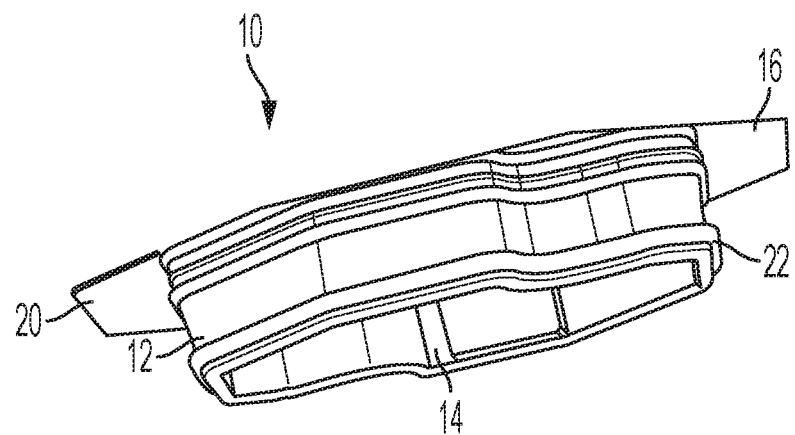
FIG. 2 is a perspective view of the access plug of FIG. 1, showing an outer periphery of the access plug.
Figure 3:
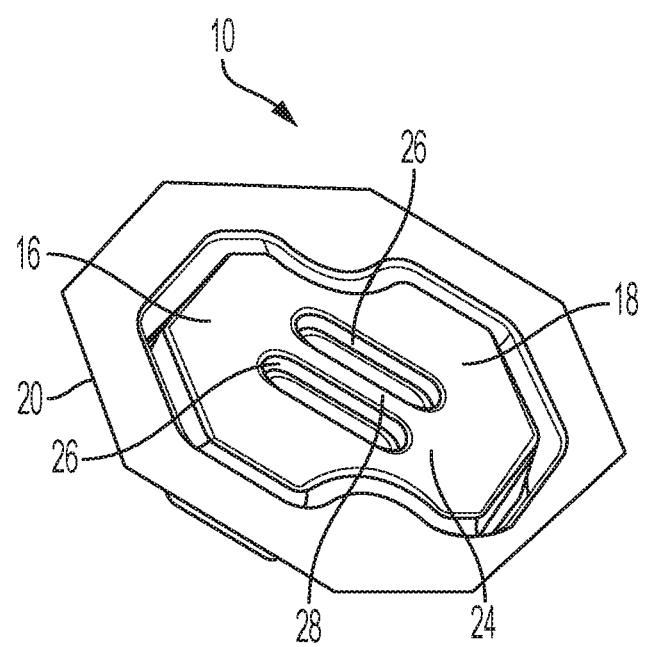
FIG. 3 is a perspective view of the access plug of FIG. 1, showing an outer side of the access plug.

FIG. 1 is a perspective view showing an example of an inner side of an access-side plug 10 for use with a utility enclosure or penetration. For the purposes of the present disclosure, reference to utility enclosures, enclosures or the like shall also include other penetrations or structures within a structural form, such as piping, conduits, ductwork (HVAC) and the like. In one embodiment, the access-side plug 10 (referred to herein as the access plug) may be used with the utility enclosure during installation of the utility enclosure in a structural form, such as a floor, ceiling or wall. The term access plug is to be understood to refer a plug that can be removed after a concrete pour that encases the enclosure (i.e., the plug can be accessed after the concrete pour). Conversely, the terms non-access plug is to be understood to refer to a plug that is not accessible after a concrete pour in that such a plug may be partially or fully encased within the concrete. FIG. 2 is a perspective view of the access plug of FIG. 1, showing an outer periphery of the access plug 10. FIG. 3 is a perspective view showing an outer side of the access plug of FIG. 1.

Referring to FIGS. 1-3, the access plug 10 includes a sidewall 12 defining an inner peripheral area 14. The sidewall 12 may be formed as a continuous wall to define a closed loop, or a substantially closed loop. In another embodiment, the sidewall may be formed by a plurality of spaced apart segments which generally define the inner peripheral area 14.

The access plug 10 also includes a lid 26 connected to the sidewall 12. The lid 10 includes a body 18 extending over the inner peripheral area 14. Preferably, the body 18 is formed integrally and continuously with the sidewall 12 and extends over an entirety of the inner peripheral area 14 defined by the sidewall 12. Alternatively, the body 18 may be secured to sidewall 12, for example, with adhesive or the like. Preferably, the body 18 and sidewall 12 are connected to one another in a sealed manner so as to prevent or limit flow of a fluid into the inner peripheral area 14 when installed in a utility enclosure as discussed below.

The lid 16 also includes a flange 20 extending outwardly from the sidewall 12, away from the inner peripheral area 14. The flange 20 may extend continuously with the body 18 or may be spaced from the body, for example, by a thickness of the sidewall 12. In one embodiment, the sidewall 12 may be formed having a generally U-shaped cross section. The flange 20 may extend from one leg of the U-shaped sidewall 12 and the body 18 may extend from another leg of the U-shaped sidewall 12. The flange 20 and body 18 of the lid 16 may extend in the same plane, i.e., the flange 20 and body 18 may be coplanar.

In one embodiment, the access plug 10 is made from plastic, or other suitable materials, including other suitable polymers or elastomeric polymers. The access plug 10 may be formed, for example, in a molding process, such as injection molding. However, it is understood that the present disclosure is not limited to these examples, and other suitable materials and manufacturing processes are envisioned.

Still referring to FIGS. 1-3, the access plug 10 may include a projection 22 extending along a periphery of the sidewall 12. In one embodiment, the access plug 10 may include two or more projections 22. The projection 22 may be, for example, a strip of material 22 secured to the sidewall 12, for example, by an adhesive or other suitable fastener. In one embodiment, the strip of material 22 may be seated in a groove on the sidewall 12. The strip of material may be a different material than that of the sidewall 12. For example, in one embodiment, the strip of material 22 may be made from foam. In another embodiment, the strip of material 22 may be, for example, an elastomer or other similar, suitable material.

Alternatively, or in combination with the strip of material above, the projection 22, or a projection of a plurality of projections 22, may be formed from the same material as the sidewall 12. In one embodiment, the projection 22 may be formed integrally and continuously with the sidewall 12 in a molding process. In still another embodiment, the projection 22 may be formed in a two-shot injection molding process and may be formed of the same material or a different material than the sidewall 12.

The projection 22 is configured to contact an inwardly facing surface of the utility enclosure, as will be described further below. Preferably, the projection 22 provides a sealing function between the sidewall 12 and the utility enclosure to prevent or restrict ingress of a fluid to the inner peripheral area 14. The projection 22 may also provide an interference or friction fit between the lid 16 and the utility enclosure, as described below.

The access plug 10 may further include a tool engagement section 24, configured to allow a tool to engage the access plug 10 to remove the access plug 10 from the utility enclosure. In one embodiment, the tool engagement section 24 is formed as one or more recesses 26 formed in the lid 16. Further, in a non-limiting embodiment, the tool engagement section 24 may include two recesses 26 separated by ridge 28. A removal tool (not shown) may grip the ridge 28 so that the removal tool may apply a pulling force to the access plug 10 to remove the access plug 10. It is understood that tool engagement section 24 is not limited to this configuration, and other suitable configurations are envisioned. For example, the tool engagement section 24 may include a bridged section extending across a recess which may be engaged by a tool, or a hook-shaped recess. Alternatively, or in addition, the access plug 10 may be removed by a removal tool which engages the tool engaging section 24 to apply a prying force to the access plug 10.

Figure 9:
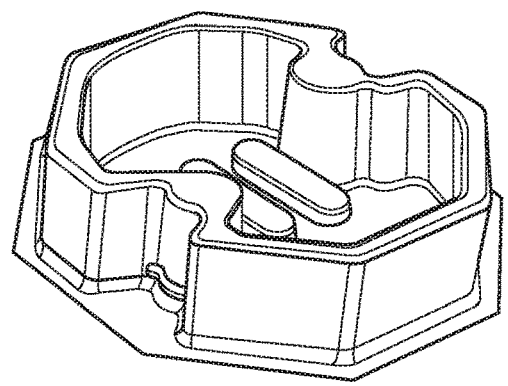
FIG. 9 is a perspective illustration of an embodiment of the access plug.

An alternate embodiment of the access plug 110 is illustrated in FIG. 9. This embodiment is similar to the embodiment of FIG. 1, et al., and includes grab pockets so that a user may use their fingers to grasp and remove the plug form the enclosure after a concrete pour, as described in more detail below. In addition, inwardly projecting lobes can accommodate rounded or squared screw tabs on the enclosure (not shown, but will be recognized at the lip of the enclosure).

Figure 4:
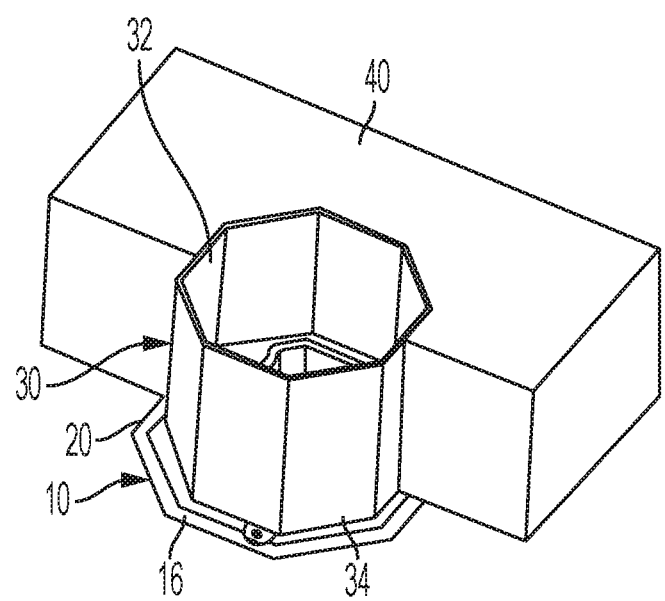
FIG. 4 is a perspective view of an example showing a model of a utility enclosure or penetration installed in a structural form, with a portion of the structural form cut away for clarity, according to an embodiment described herein.

FIG. 4 is a model showing an example of a utility enclosure 30 installed a structural form 40, with a portion of the form 40 cut away for clarity. It is understood that the utility disclosure 30 may be embodied as a number of different enclosures. For example, the utility enclosure 30 may be an electrical enclosure or a junction box configured for installation in a structural form such as a floor, ceiling or wall, and in particular, a concrete floor, ceiling or wall. In one embodiment, the utility enclosure 30 may have one or more conduits extending therefrom.

The utility enclosure 30 may be installed in the structural form to provide a conduit through the structural form. For example, the utility enclosure 30 may provide a conduit through which electrical cables and/or wires may extend, or a box in which electrical cables or wire by housed. In one embodiment, the utility enclosure 30 includes an enclosure body 32 having at least one open end 34. The at least one open end is configured to have the access plug 10, 110 disposed therein. For example, in one embodiment, the sidewall 12 of the access plug 10, 110 may be received within the open end 34, while the lid 16 extends across the open end 34 to substantially close and seal the open end 34.

In one embodiment, a profile of the sidewall 12 may substantially match a profile of an inwardly facing surface of the enclosure body 32. In addition, in one embodiment, the sidewall 12 may be formed having a slightly smaller width than the enclosure body 32 so that the sidewall 12 may be received within enclosure body 32. Further, in one embodiment, the sidewall 12, together with the projection 22, may have a width slightly greater than a width of the enclosure body 32, and the projection 22 may be compressed upon insertion of the access plug 10, 110 into the enclosure body 32 such that the access plug 10, 110 is held in the enclosure body 32 by an interference or friction fit.

As most clearly shown in FIG. 1, the sidewall 12 may also be formed with one more inward projecting lobes 38 along its periphery. The inward projecting lobes 38 may, for example, assist in insertion and removal of the access plug 10, 110 from the utility enclosure 30 by providing a gap between an outer periphery of the sidewall 12 or projection 22 and the inwardly facing surface of the enclosure body 32. The lobes 38 may also accommodate tabs and the like that extend inwardly of the lip (not shown) of the enclosure.

Figure 5:
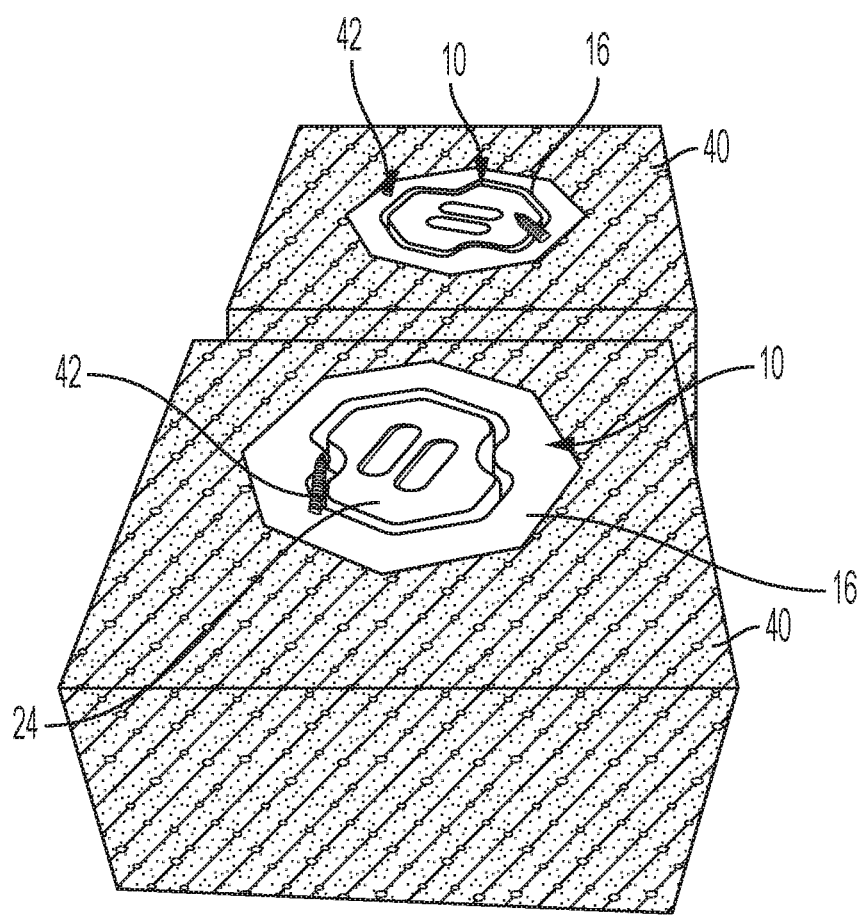
FIG. 5 is a perspective view showing structural forms having a plurality of the access plugs of FIG. 1 disposed in respective utility enclosures or penetrations installed in the forms, according to an embodiment described herein.

FIG. 5 is a perspective view showing two structural forms 40, each having a plug 10 positioned in a utility enclosure (not shown) installed in the structural forms 40, according to an embodiment described herein. According to the embodiments described herein, and with reference to FIGS. 4 and 5, the access plug 10, 110, and in particular, the sidewall 12 of the access plug 10, 110 is received within an open end of the enclosure body 32, and may be supported on the enclosure body 32 by, for example, and inner side of the flange 20 positioned against an end of the enclosure body 32. The access plug 10, 110 may also be supported by way of the interference or friction fit between the projection 22 and the inwardly facing surface of the enclosure body 32.

The utility enclosure 30 and the access plug 10, 110 may then be positioned in a receiving form (not shown) defining a volume with an outer side of the access plug 10, 110 disposed against a surface of the receiving form. The outer side of the access plug 10, 110 may correspond to a bottom side of utility enclosure 30 and bottom of the receiving form. In one embodiment, and outer side of both the flange 20 and body 18 of the lid 16 are positioned against the surface of the receiving form. A fastener 42, such as a nail or screw, may be driven lid 16 and into the receiving form to secure the access plug 10, 110 and enclosure body 32 to the receiving form. The receiving form is configured to receive and retain a volume of the structural form, such as concrete, in a fluid or semi-solid, uncured state. Accordingly, the concrete may flow into the receiving form and substantially surround the utility enclosure 30. However, due to the access plug 10, 110, and in particular, the lid 16 of the access plug 10, 110 being positioned against and fastened to the receiving form surface as described above, flow of the structural form material between the lid 16 and the receiving form may be limited. In addition, the projection 22 may prevent or limit ingress of the structural form material into the enclosure body 32.

Referring to FIG. 5, the structural form(s) may be removed from the receiving form(s). As shown in FIG. 5, an outer side of the lid(s) 16 may be substantially uncovered, or free of structural form material, such as concrete, for at least the reasons detailed above. To remove the structural form(s) from the receiving form(s), the fasteners extending through the lid 16 may be unfastened from the receiving form(s). In addition, as shown in FIG. 5, at least a portion of the flange 20 of the lid 16 may extend over a portion of the structural form 40.

Figure 6:
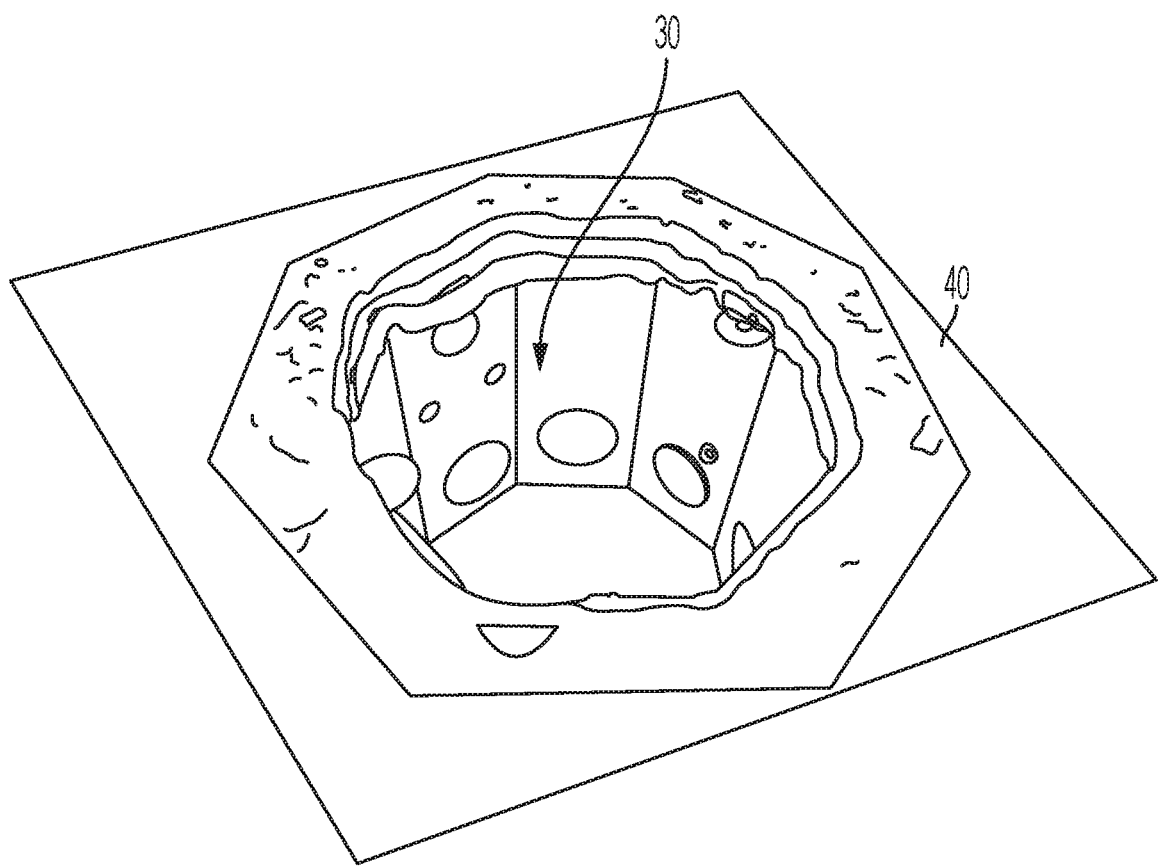
FIG. 6 is a perspective view showing a utility enclosure or penetration installed in a structural form with the access plug removed, according to an embodiment described herein.

FIG. 6 shows an example of a utility enclosure 30 installed in a structural form 40 with the access plug 10, 110 removed. According to one embodiment, to remove the access plug 10, 110 from the enclosure body 32, a removal tool may engage the tool engagement section 24 of the access plug 10, 110. For example, the removal tool may engage the one or more recess 26, or a ridge 28 defined between the recesses 28. Upon removal of the access plug 10, 110 the utility enclosure 30 may be positioned in the structural form, such as a wall, floor, ceiling or similar to receive one or more electrical cables, wire connectors, or similar electrical components, and alternatively or additionally, one or more pipes or other fluid carrying vessel, to allow for access through the structural form.

Figure 7:
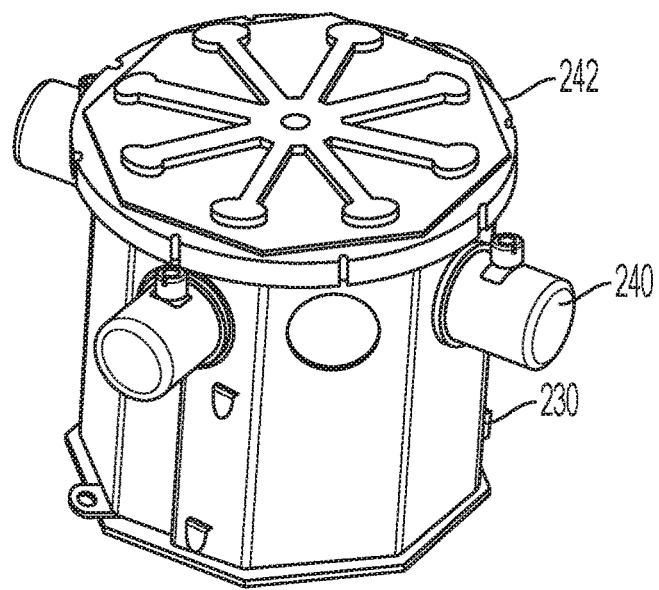
FIG. 7 is a perspective illustration of an enclosure with an access plug and non-access enclosure and connector plugs.
Figure 8:
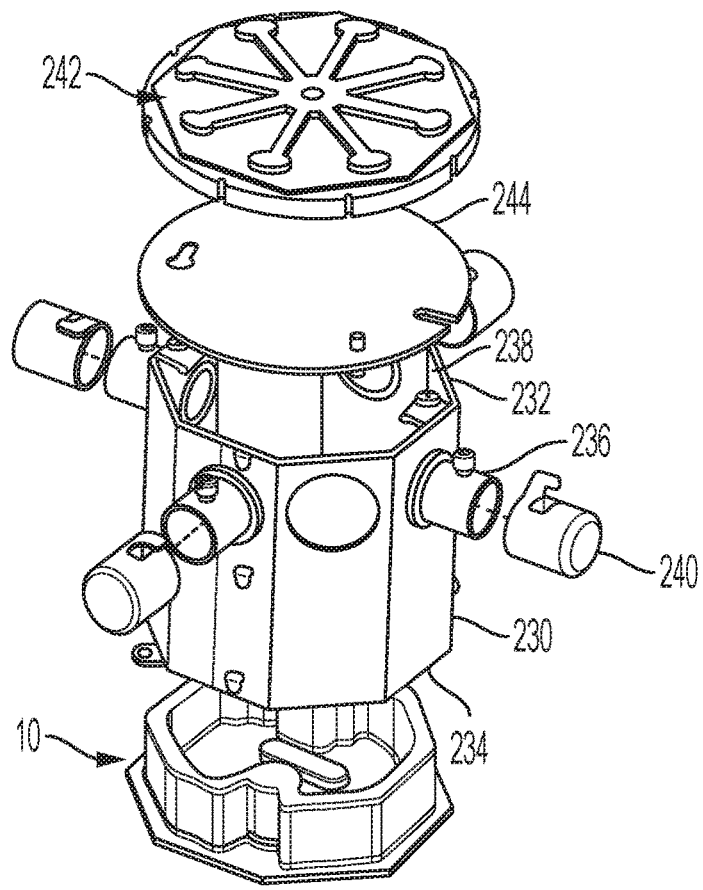
FIG. 8 is an exploded perspective illustration of the enclosure and plugs of FIG. 7.

FIGS. 7 and 8 are perspective illustrations of an enclosure 230 having an open top 232 and an open bottom 234, as well as penetrations 236 in the form of connectors or nipples into the interior 238 of the enclosure 230. In FIG. 7, plugs 210, 240 and/or covers 242 are present on each of the openings and in FIG. 8, the plugs 210, 240 and/or covers 242 are shown in an exploded view.

As will be appreciated by those skilled in the art, the open top 232 of the enclosure 230 may have a blank 244 installed on the top to protect or isolate, for example, wires inside of the enclosure 230. The blank 244 is typically round, but can have a variety of shapes. The blank 244 may be secured to the enclosure by fasteners 246, such as screws.

Figure 12:
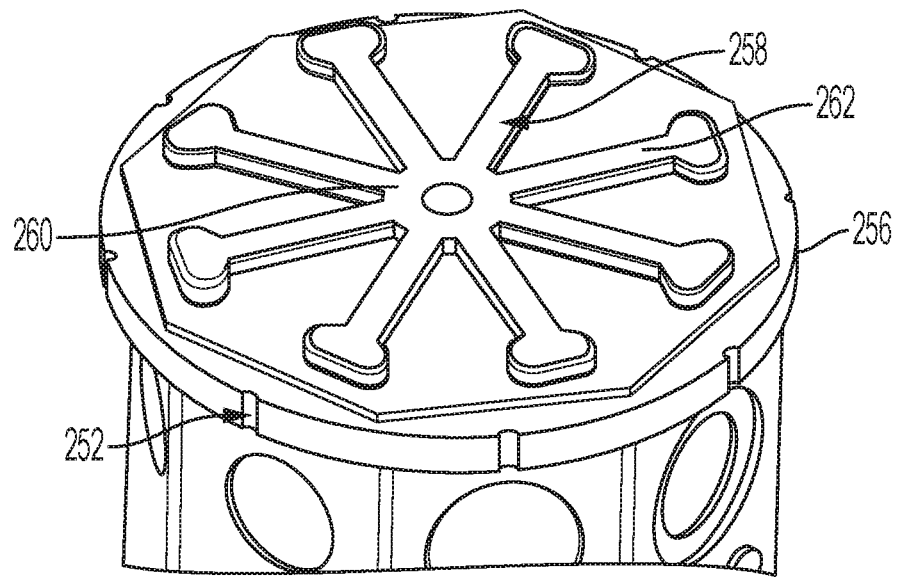
FIGS. 12 and 13 are full and partially cut-away perspective illustrations of the non-access plug or cover for the enclosure.
Figure 13:
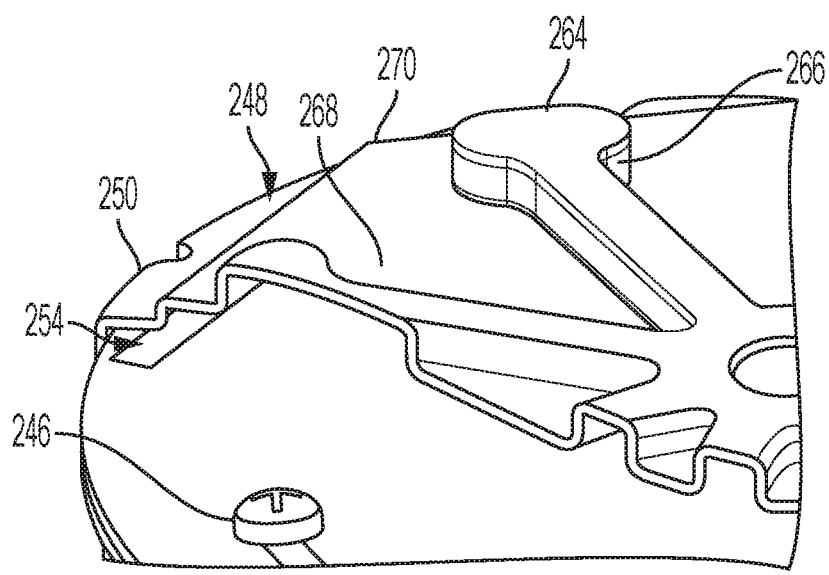

Referring to FIGS. 12 and 13, the enclosure cover, indicated generally at 242, has a circular top portion 248 and a depending lip 250. In an embodiment, the lip 250 has undercuts or recesses 252 formed therein at predetermined locations that snap or lock onto standard diameter blanks 244, such as a standard 4½ inch blank. Optionally, an adhesive 254, such as a thin foamed adhesive member can be positioned on the cover 242, at about the juncture 256 of the top and 242 the lip 250 to provide an additional seal for the cover 242 on the blank 244.

In an embodiment, the cover 242 can have channels 258 formed therein in, for example, a hub 260 and spoke 262 configuration, with enlarged head spaces 264 at the ends 266 of the spokes 262 to accommodate the fasteners 246 that secure the blank 244 to the enclosure 230. The channels 258 provide additional structural rigidity (e.g., structural integrity) to the cover 242 to assure that it remains in place on the enclosure 230 and properly seals the enclosure 230. In some installations, the enclosure 230 may be used without the blank on the enclosure 230. As illustrated in FIG. 12, an embodiment of the cover 242 can include a recessed area 268 inwardly of the lip 250. In the illustrated embodiment, the recessed area 268 has an octagonal shape that corresponds to the octagonal shape of the commonly known enclosure 230. The octagonal recess 268 extends outwardly to the depending lip 250; that is, the points 270 of the octagonal recess 268 extend toward the juncture 256 of the top portion 248 and the lip 250. In this manner, when the blank 244 is not used on the enclosure 230, the octagonal recess 268 fits over the open octagonal top 232 of the enclosure 230 to seal the enclosure 230. Because the adhesive 254, such as the thin foamed adhesive member, is positioned on the cover 242 at about the juncture 256 of the top 248 and the lip 250, it provides a seal for the cover 242 on the edges of the enclosure 230. It has been found that the cover 242 retains its integrity and maintains a seal on the enclosure 230 when the enclosure 230 is installed in concrete, for example, in a concrete ceiling, with concrete poured around and over the enclosure 230.

Figure 10:
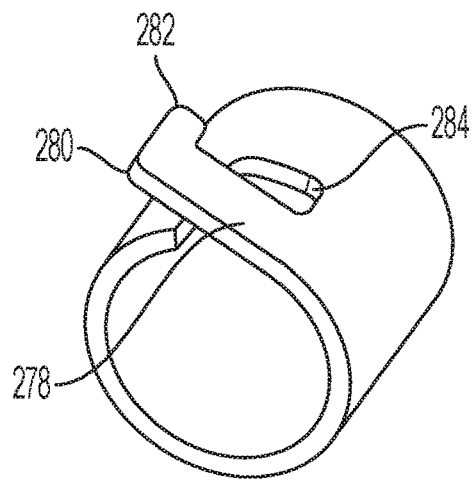
Figure 11:
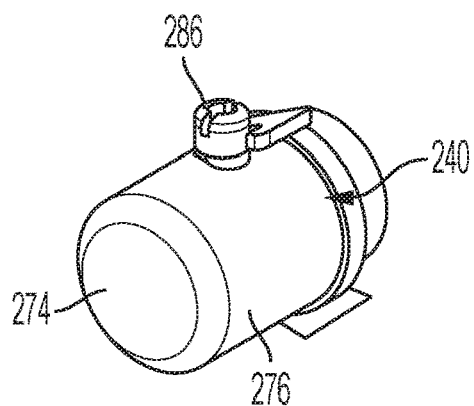

Referring briefly to FIG. 8 and to FIGS. 10 and 11, enclosures 230 and specifically enclosures 230 for electrical use, include connectors 236 that provide a way in which to connect a member such as conduit (not shown) and the like to the enclosure 230 to route, for example, wire and cable into and through the enclosure 230. The illustrated enclosure 230 includes four (4) such connectors 236. In certain installations, not all of the connectors 236 will be used to route or install members, e.g., conduit. That is, in certain installations, only one, two or three of the connectors 236 may be used, and the other, non-used connectors 236 must be sealed to prevent the ingress of concrete during a pour. Previously, unused connectors 236 were taped over to cover the connector 236 opening to prevent concrete ingress. However, problems similar to those of other taped enclosure openings were observed.

As seen in FIGS. 8, 10 and 11, the connector plug or cap 240 includes a top portion 274 and a deep, depending skirt 276 portion. A circumferentially extending tab 278 is formed at an end 280 of the skirt 276. The tab 278 has an upwardly projecting finger 282 at an end thereof. The tab 278 and finger 282 define an open, lateral (circumferentially extending) slot 284 between the tab 278 and skirt 276. As seen in FIG. 11, conventionally, the connector 236 includes a screw 286 to secure the member, e.g., conduit thereto. The present connector plug 240 is configured to accommodate the screw 286 in the slot 284 between the tab 278 and the skirt 276 such that the screw 286 secures the plug 240 to the connector 236. The plug 240 can also be positioned on the connector 236 such that the tab 278 covers the screw 286. In this manner the connector plug 240 maintains a seal at the connector 236 when the enclosure 230 is installed with concrete poured around and over the enclosure 230.

Figure 14A:
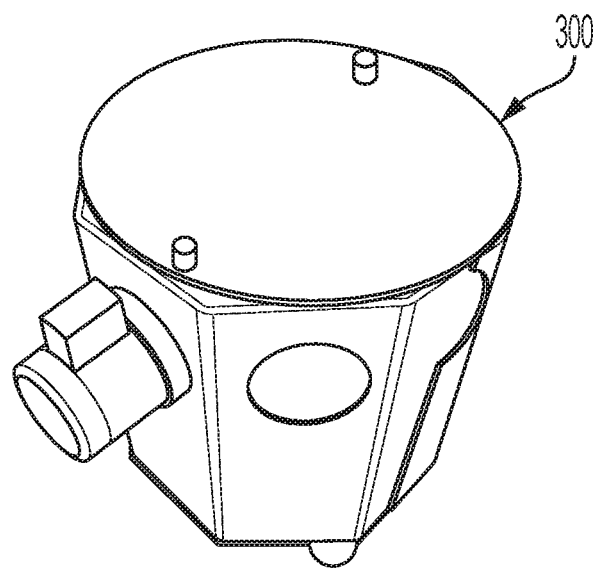
FIGS. 14A-14C illustrate an embodiment of an enclosure with having an environmental sealing material applied to the enclosure.
Figure 14B:
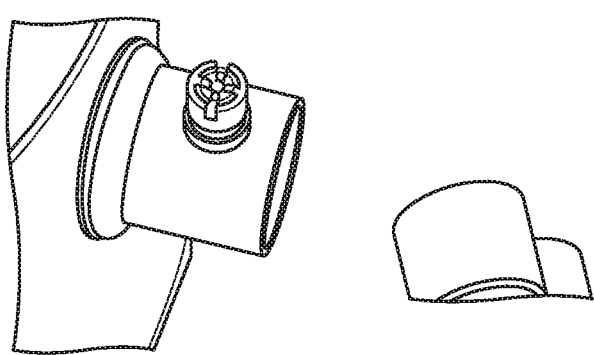
Figure 14C:
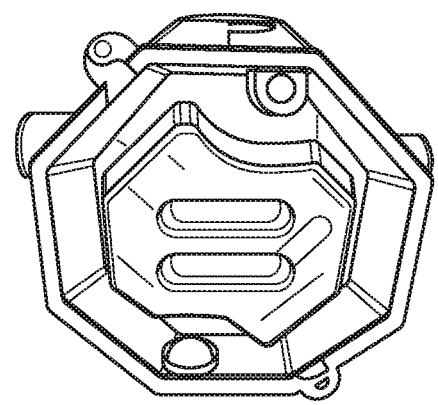
Figure 15:
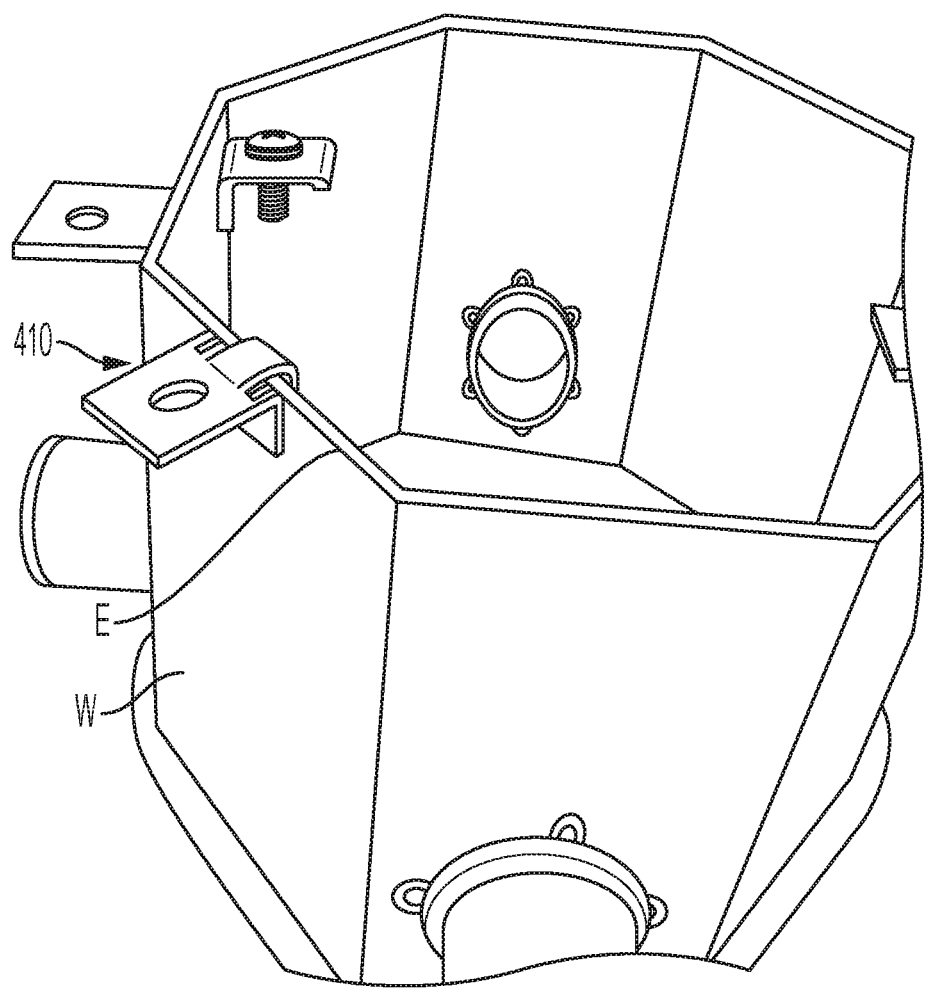
Figure 16:
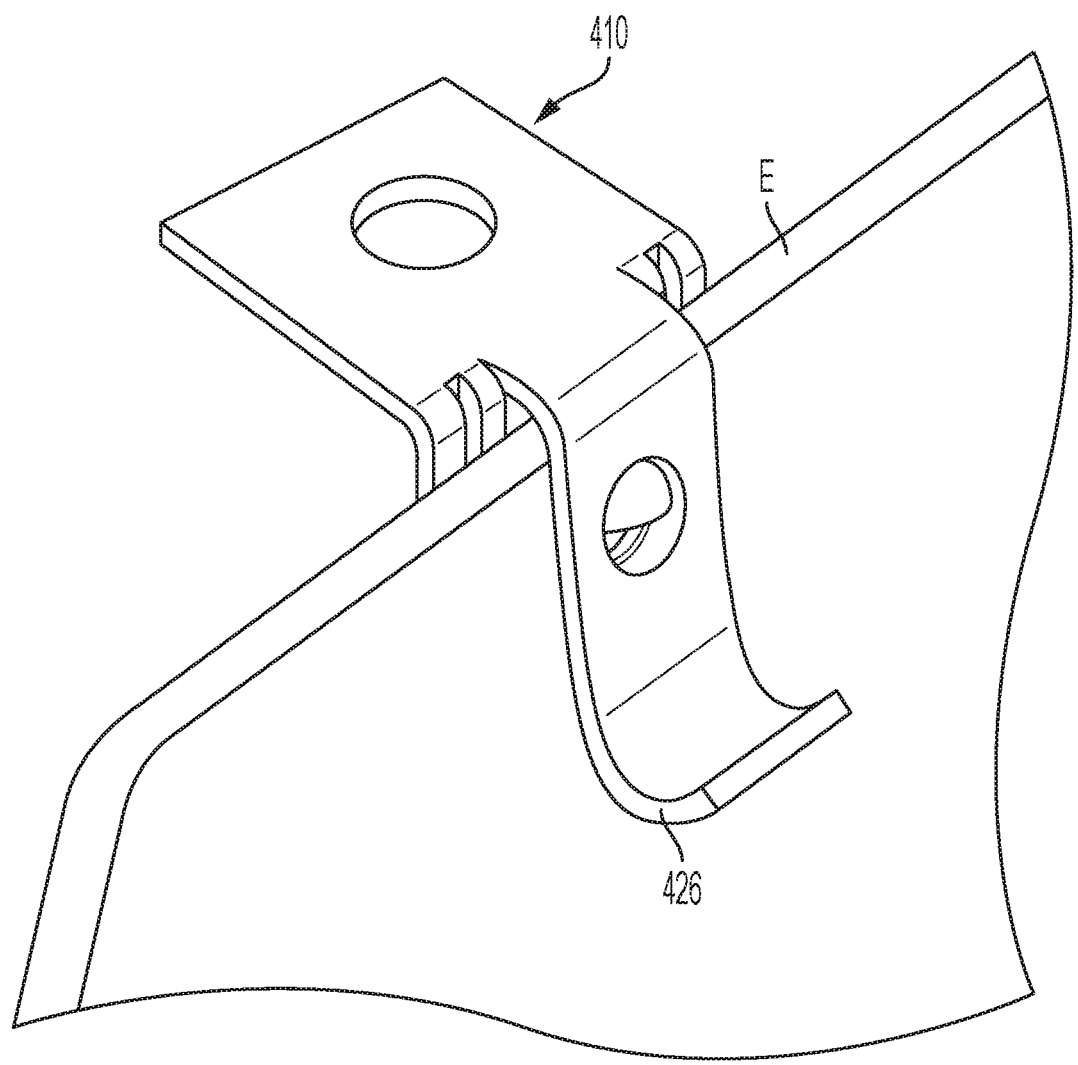

FIGS. 14-16 illustrate an enclosure 230 that has an environmental sealing material 300 applied to the enclosure 230. It will be appreciated that even with the plugs 210, 240, and covers 242 in place, concrete poured over and around the enclosure 230 may still find small openings through which the concrete will enter the enclosure 230. In order to prevent such unwanted ingress of concrete, the entirety of the enclosure 230 can have the environmental sealing material 300 applied thereto. One suitable material 300 is a spray-applied closed cell foam, such as a spray-applied polyurethane. Other suitable materials will be recognized by those skilled in the art.

In use of the enclosure 230 with the environmental seal 300 applied, the enclosure 230 is assembled with the top cover 242 in place, the bottom plug 210 in place and the connector plugs 240 on the connectors 236. The sealing material 300 is then applied to the enclosure 230, for example, by spraying the material 300 onto the enclosure 230. For connectors 236 that are not intended to be used, the connector plug 240 and sealing material 300 are left on the connector 236 and plug 240. For connectors 236 that are intended to be used, the plug 240 is first positioned on the connector 236 so as to cover the screw 286. One the material 300 is applied to the enclosure 230, the plug 240 is removed from the connector 236 (see FIG. 14B) which removes the sealing material 300 substantially only on the connector 236 to provide clean access to the connector 236 and the screw 286. Since the screw 286 was covered by the plug 240 (by the tab 278) when the plug is removed the screw is clean (with no material 300 clogging the screw head), and the conduit or other member is connected to the connector 236 to assemble the enclosure 230. The enclosure 230 is then positioned in place and concrete is poured around the enclosure 230. Once the concrete is poured and sufficiently cured, and the forms removed, the bottom plug 210 can be removed (as described above) to access the interior 238 of the enclosure 230 to carry out any necessary installations, such as pulling wire, cable and the like.

FIGS. 15-18 illustrate a clip 410 for use with a utility enclosure 30 such as the enclosures illustrated for example, in FIGS. 4, 6-8, 12 and 14A-C. The clip 410 is used to temporarily secure the enclosure 40 to the form 40 during concrete pouring. The clip 410 is configured so that it can be removed from the enclosure 30 and form 40 after the concrete is poured.

In an embodiment, the clip 410 includes a generally L-shaped body 412 having first and second legs 414, 416 generally perpendicular to one another. The first leg 414 has an opening 418 and a pair of depending fingers 420 that are parallel to and inwardly spaced from the second leg 416. In an embodiment the fingers 420 have inclined or ramped ends 422.

The second 416 leg, again, which is outwardly spaced from the fingers 420, has a depending portion 424 that, in an embodiment, terminates in an outwardly oriented hook-like portion 426. Intermediate the hook-like portion 426 and the juncture 428 of the first and second legs, a detent 430 is formed in the second leg 416. In an embodiment the detent 430 is a quarter-spherical protrusion that is formed in the second leg 416 that protrudes toward the first leg 414.

Figure 17:
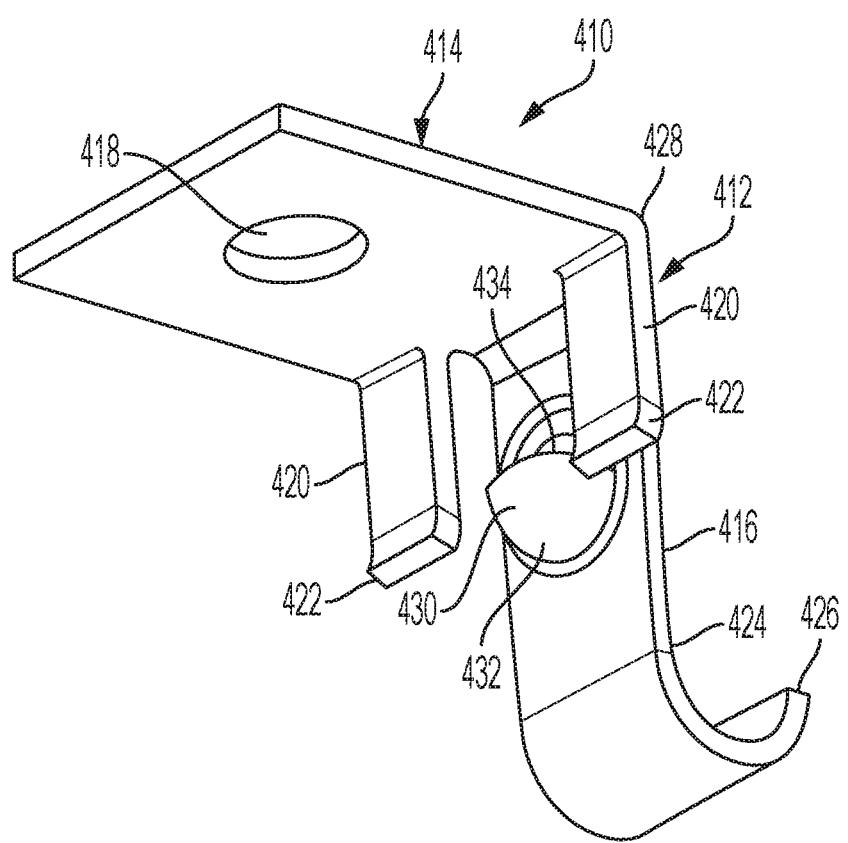
Figure 18:
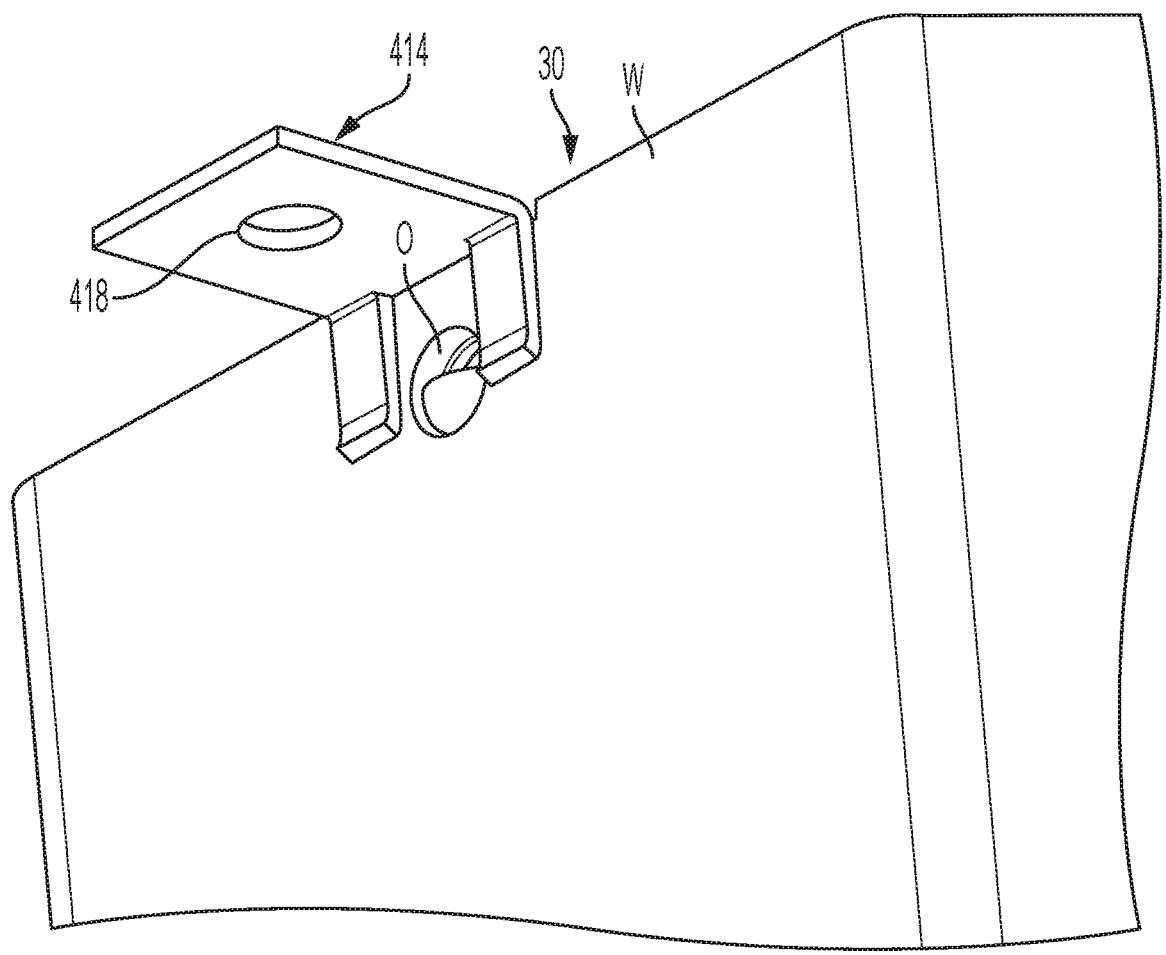

As best seen in FIGS. 15, 17 and 18, the clip 410 is positioned over an edge E of the enclosure 30 with the enclosure wall W between the second leg 416 and the depending fingers 420, and the first leg 414 positioned outward of the enclosure 30. As seen in FIG. 18, as positioned on the enclosure 30, the detent 430 sits in an opening O in the enclosure wall W to temporarily but securely secure the clip 410 to the enclosure wall W.

The clip 410 remains on the enclosure 30 to affix the enclosure 30 to the form. The enclosure 30 (and clip 410) can be secured in place by a fastener (not shown) that is driven through the opening 418 in the first leg 414 and into the form. The clip 410 thus remains in place when the concrete is poured. After the concrete is poured, the fastener is removed and the clip 410 can be removed from the enclosure 30. To remove the clip 410, a plier or other tool can be used to grasp the hook 426 portion, pull the second leg 416 away from the enclosure wall W to release the detent 430 from the opening O, and the clip 410 can be slid from the enclosure wall W.

As is seen in FIGS. 17 and 18, an embodiment of the detent 430 is a quarter-spherical protrusion. This configuration provides a rounded surface 432 to permit readily sliding and installing the clip 410 on the enclosure wall W while securely maintaining the clip 410 on the wall W (with an edge 434 of the quarter-sphere engaging a wall of the opening O). Other shapes of protrusions, detents and the like will be appreciated by those skilled in the art and are within the spirit of the present disclosure.

It is anticipated that the clip 410 will be formed from a material such as steel or a relatively rigid polymer (plastic) that has sufficient stiffness to secure to the enclosure 30 and to retain the enclosure 30 in place in the form 40 during concrete pouring, but is also sufficiently plastic (e.g., flexible) so that it can be bent or flexed (so that the second leg 416 can be urged outwardly, away from the enclosure wall W) to remove the clip 410 once the concrete is poured.

It is understood the various features from any of the embodiments above are usable together with the other embodiments described herein. Further, it is understood that same or similar terminology used across the different embodiments above refers to the same or similar component, with the exception of any differences described or shown in the figures.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within the scope of the claims.

What is claimed is:

1. A plug for a utility enclosure or penetration, the plug comprising:
   a sidewall configured to be received in an open end of the utility enclosure or penetration, the sidewall defining a periphery;
   a lid extending over one end of the sidewall, the lid having a body extending over an inner peripheral area defined by the sidewall, and a flange extending outwardly from the body; and
   a tool engagement section formed in the body, the tool engagement section having a pair of recesses in the body inwardly spaced from the sidewall, the recesses separated from one another by a wall.

2. A plug for a utility enclosure or penetration, the plug comprising:
   a sidewall configured to be received in an open end of the utility enclosure or penetration, the sidewall defining a periphery;
   a lid extending over one end of the sidewall, the lid having a body extending over an inner peripheral area defined by the sidewall, and a flange extending outwardly from the body; and
   a projection extending along a periphery of the sidewall, the projection configured to engage a corresponding wall of the utility enclosure or penetration.

3. The plug of claim 2, wherein the projection is a strip of material.

4. The plug of claim 3, wherein the material is foam.

5. A utility enclosure or penetration comprising:
   an enclosure or penetration body having an open end; and
   a plug configured for removable positioning in the open end, the plug having a sidewall configured to be received in the open end of the enclosure or penetration body, the sidewall defining a periphery, a lid having a body extending over an inner peripheral area defined by the sidewall and a flange extending outwardly from the body, and a tool engagement section formed in the body, the tool engagement section having a pair of recesses formed in the body inwardly spaced from the sidewall, the recesses separated from one another by a wall.

6. A utility enclosure or penetration comprising:

an enclosure or penetration body having an open end;

a plug configured for removable positioning in the open end, the plug having a sidewall configured to be received in the open end of the enclosure or penetration body, the sidewall defining a periphery, and a lid having a body extending over an inner peripheral area defined by the sidewall and a flange extending outwardly from the body; and a projection extending along a periphery of the sidewall, the projection configured to engage an inwardly facing surface of the enclosure body or penetration.

7. The utility enclosure or penetration of claim 6, wherein the projection is a strip of material.

8. The utility enclosure or penetration of claim 7, wherein the material is foam.

* * * * *